United States Patent [19]

Hattori et al.

[11] 4,043,572

[45] Aug. 23, 1977

[54] AIR BAG DEVICE FOR VEHICLES

[75] Inventors: Yoshiyuki Hattori, Nagoya; Mikio Suzuki, Hekinan; Masahiro Taguchi, Nishio, all of Japan

[73] Assignee: Nippon Soken, Inc., Nishio, Japan

[21] Appl. No.: 595,742

[22] Filed: July 17, 1975

[30] Foreign Application Priority Data

Aug. 21, 1974  Japan .................................. 49-96314

[51] Int. Cl.² ........................................... B60R 21/08
[52] U.S. Cl. ................................... 280/738; 137/844; 280/729
[58] Field of Search .............. 280/729, 730, 736, 738, 280/739, 740; 137/844, 845, 513.3

[56] References Cited

U.S. PATENT DOCUMENTS

| 3,642,303 | 2/1972 | Irish | 280/730 |
|---|---|---|---|
| 3,733,091 | 5/1973 | Fleck | 280/729 |
| 3,767,225 | 10/1973 | Mazelsky | 280/729 |
| 3,791,669 | 2/1974 | Hamilton | 280/738 |
| 3,801,127 | 4/1974 | Katter | 280/738 |
| 3,907,327 | 9/1975 | Pech | 280/729 |

FOREIGN PATENT DOCUMENTS 1,324,401  7/1973  United Kingdom ................. 280/738

Primary Examiner—John P. Silverstrim
Attorney, Agent, or Firm—Cushman, Darby & Cushman

[57] ABSTRACT

An air bag device designed to protect passengers in a vehicle. In the device, an inflatable gas bag is inflated by a gush of high pressure gas which is discharged from a gas supply source through a gas discharging pipe and guided by a housing. The housing has defined therein large openings to introduce ambient air, and has mounted, at the region where the inflatable gas bag are mounted, gas permeable supporting plates and valve members urged against the gas-permeable supporting plates. The gush of the high pressure gas discharged through the gas discharging pipe sucks in and mixes with the ambient air introduced through the large openings in the housing. The resultant air-high pressure gas mixture passes through the supporting plates, opens the valve members and then, flows into the inflatable bag to inflate the latter.

4 Claims, 7 Drawing Figures

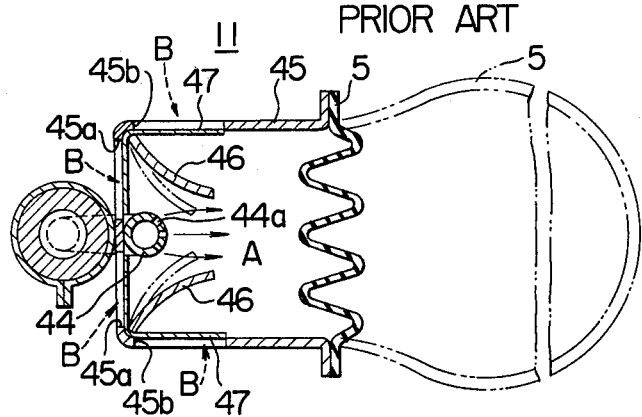
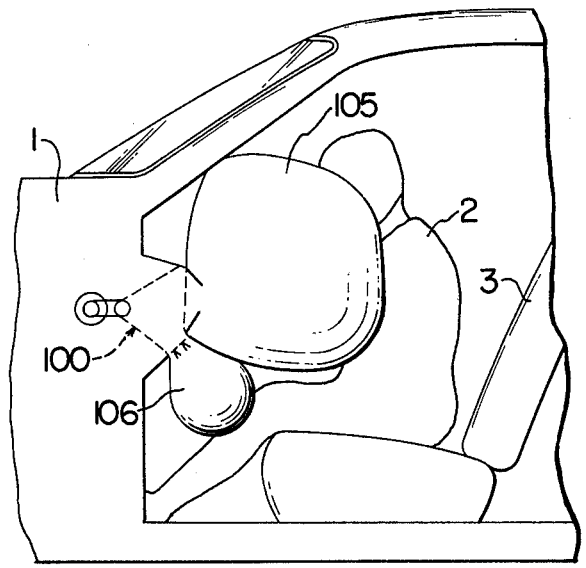
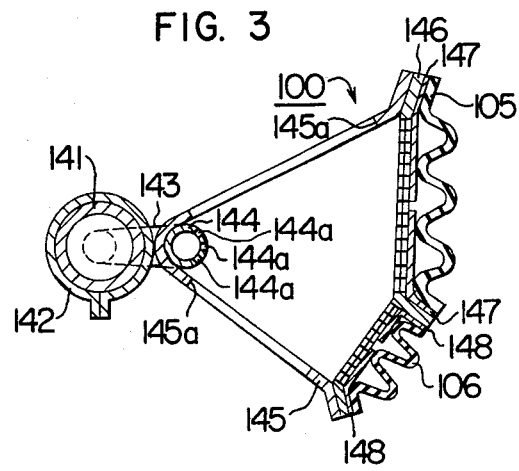
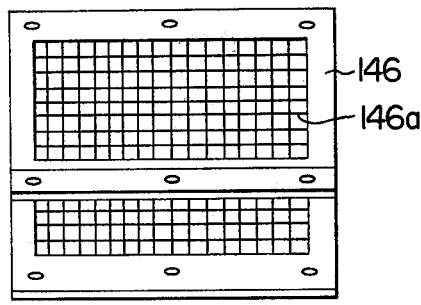

4,043,572

AIR BAG DEVICE FOR VEHICLES

BACKGROUND OF THE INVENTION

1. Field Of The Invention

The present invention relates to an air bag device for vehicles in which when the bags are expanded the air in the passenger compartment is drawn into the bags.

2. Description Of The Prior Art

In the conventional air bag devices for vehicles which have an air drawing capability of this type, the air in the passenger compartment is drawn through air suction passages provided in the housing by means of a jet stream of a high pressure gas discharged from the nozzle of a gas discharging pipe. The air in the passenger compartment passes in a pressing manner through a one-way valve supported by a supporting plate impermeable to air and is drawn into the bag. For this reason, the housing to be installed in the vehicle must be small in size, and the sectional area of the suction passage cannot be made large because it is limited by the length of the supporting plate, resulting in a decreased air suction efficiency. What is more, since the supporting plate determines the direction of the jet stream to produce a loss of the speed of the jet stream, it is impossible to use a bag to restrain the passenger's knees, the special condition permitting only the use of a bag to restrain the upper half of the passenger's body. This leads to a need for a so-called knee pad and a need for a complicated construction to absorb the energy of the passenger in an ideal manner.

SUMMARY OF THE INVENTION

An object of the present invention is to provide an air bag device for vehicles comprising means for discharging a high pressure gas, bag means adapted to be expanded by the gas discharged from said gas discharging means, the air in the passenger compartment being drawn into said bag means through at least one air suction passage when said bag means is expanded by said high pressure gas, at least one supporting plate which is permeable to gases, and at least one resilient valve normally placed in a state to press said supporting plate, said supporting plate and said valve being disposed between said gas discharging means and said bag means.

Another object of the present invention is to provide an air bag device for vehicles in which said bag means comprises a torso bag and a knee bag.

Still another object of the present invention is to provide an air bag device for vehicles in which said valve comprises an inner portion which is made of a resilient material and has discharge holes and an outer surrounding portion which is made of an air-permeable material and surrounds said inner portion.

A further object of the present invention is to provide an air bag device for vehicles in which said valve is made of an air-permeable cloth.

A further object of the present invention is to provide an air bag device for vehicles in which said valve is made of an air-permeable synthetic resin.

A further object of the present invention is to provide an air bag device for vehicles in which said valve is normally placed in a state to press the supporting plate in such a manner that a space is kept between said valve and said supporting plate.

A further object of the present invention is to provide an air bag device for vehicles in which the portions of said supporting plate where the gas passes through comprise wire gauze members.

A further object of the present invention is to provide an air bag device for vehicles in which said torso bag and said knee bag respectively have said valves.

In the air bag device in accordance with the present invention, thanks to its construction which has been described above, the air suction passage can have a large sectional area and there is attained the elimination of a decrease of the air suction efficiency due to the resistance to fluids of the supporting plate, so that the bag to restrain the upper half of the passenger's body can be expanded very rapidly and the bag to restrain the passenger's knees can also be expanded at the same time as the expansion of the former bag.

BRIEF DESCRIPTION OF THE DRAWINGS

FIG. 1 is a longitudinal sectional view showing a conventional air bag device;

FIG. 2 is a schematic view illustrating an automotive vehicle in which the air bag device in accordance with the present invention is installed;

FIG. 3 is a longitudinal sectional view showing an embodiment of the present invention;

FIG. 4 is a front view illustrating a supporting plate used in the air bag device in accordance with the present invention;

Figure 5:
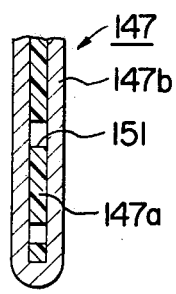
FIG. 5 is a cross sectional view showing a part of a valve used in the air bag device in accordance with the present invention.

Before the description of the embodiment of the present invention, an explanation will be given to a conventional air bag device with reference to FIG. 1, so that the present invention will be better understood.

Referring to FIG. 1, a conventional air bag device for vehicles which has an air drawing capability is provided with a gas discharging pipe 44 having a jet nozzle 44a from which the jet stream of a high pressure gas is discharged as indicated by the arrows A. Thanks to this jet stream, the air in the passenger compartment 11 is drawn through air suction passages 45a and 45b disposed in a housing 45, as indicated by the dotted arrows B. The air in the passenger compartment 11 pushes one-way valves 47 supported by air-impermeable supporting plates 46 aside and is drawn into a bag 5. For this reason, the housing 45 must be small in size if it is to be installed in the vehicle properly. In addition, the sectional areas of the air suction passages 45a and 45b cannot be made large because the sectional area of the air suction passage 45b is limited by the length of the supporting plate 46. As the result, the air suction efficiency is decreased. Another disadvantageous feature is that, since the supporting plates 46 determine the direction of the jet stream as indicated by the arrows A and consequently the jet stream losses its speed, there can be used only one bag 5 which restrains the upper half of the passenger's body and it is impossible to use a bag to restrain the knees of the passenger. This naturally leads to a necessity for a so-called knee pad and a necessity for a complicated construction to absorb the energy of the passenger in an ideal manner.

DETAILED DESCRIPTION OF THE PREFERRED EMBODIMENT

Figure 6:
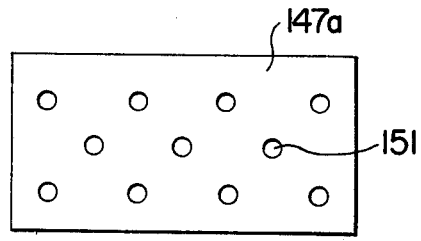
FIG. 6 is a front view illustrating the valve.

Hereunder an explanation will be made on the embodiment of the present invention shown in FIGS. 2 through 7. Referring to FIG. 2, the numerals 1 through 3 respectively designate the body of a vehicle, a passenger, and a seat. The numeral 100 indicates the device in accordance with the present invention which expands bags 105 and 106. Hereinafter the bags 105 and 106 will be called the torso bag and the knee bag respectively. Turning to FIGS. 3 through 6 which show the constructional details of the air bag device in accordance with the present invention, the numerals 141 through 143 respectively designate a pressure accumulator containing a high pressure gas, a frame for attaching the pressure accumulator 141 to the body of the vehicle 1 illustrated in FIG. 2, and a manifold for admitting the high pressure gas in the pressure accumulator 141 to a gas discharging pipe 144 having a plurality of discharge ports 144a. The numeral 145 indicates a housing which is fixed securely to the gas discharging pipe 144 and provided with air suction passages 145a. The numeral 146 designates a supporting plate. As shown in FIG. 4, the portions of the supporting plate 146 where the gas passes through are covered with screens such as wire gauze members 146a which have a low resistance to fluids, so that the gas can pass through said portions. Resilient valves 147 and 148 for the torso bag 105 and the knee bag 106 are disposed between the gas discharging pipe 144 and the two bags 105 and 106 in such a manner that, when the pressures in the bags 105 and 106 have increased, the one-way valves 147 and 148 are closed and press the supporting plate 146. Needless to say, the valves 147 and 148 must have a high tensile strength so that they are not damaged by the high speed jet streams of the high pressure gas. For instance, as illustrated in FIGS. 5 and 6, the valve 147 may comprise an inner portion 147a made of a resilient material such as a synthetic resin, a Japanese paper, and the like, and an outer surrounding portion 147b made of a material such as a cloth and the like which has a high air permeability and a high tensile strength, the outer surrounding portion 147b surrounding the inner portion 147a. The inner portions 147a of the valves 147 and 148 are provided with discharge holes 151 for discharging the gas in the bags to make weak the repulsion force on the passenger after inflation of bags. In the case of this embodiment, the air damping characteristics are attained by the discharge port 151 and a clearance defined between a pair of valve members, however, it may eliminate the clearance between a pair of the valve members. In order to avoid the interference between the valve members, when they are closed, it is preferable to provide a clearance between a pair of valve members. The valve member may be wholly made of an air permeable material such as a cloth, a synthetic resin, and the like, and may not have the discharge holes 151. In case the valve member 147 is made of a material impermeable to air, the valve member 147 should be normally placed in a state to press the supporting plate 146 in such a manner that a necessary space is maintained between the valve member 147 and the supporting plate 146 so that the portions of the supporting plate 146 where the gas presses through are not sealed completely. As the supporting plate 146 does not limit the sectional area of the air suction passage 145a, it is possible to make the sectional area of the air suction passage 145a sufficiently large, fully utilizing the space in the vehicle usable for the installation of the air bag device.

Figure 7:
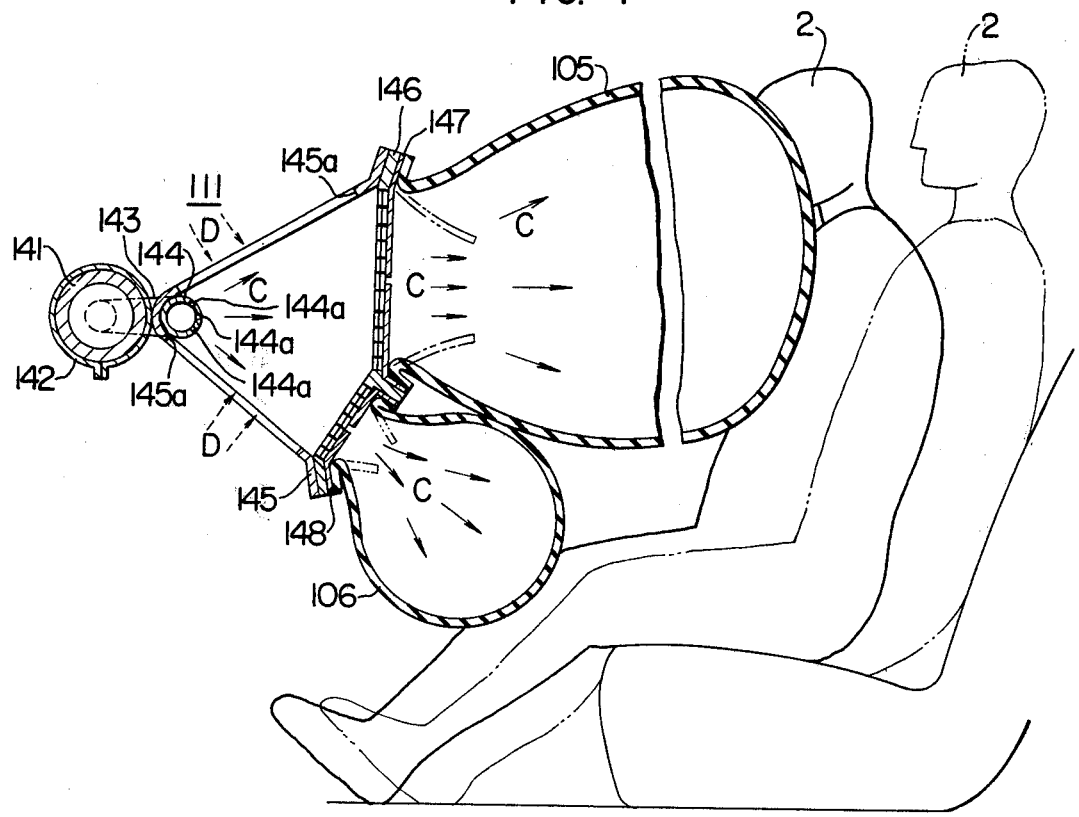
FIG. 7 is a view which shows the expanded bags for the purpose of explaining the operation of the air bag device in accordance with the present invention.

Hereunder an explanation will be given with reference to FIGS. 3 and 7 to the operation of the air bag device in accordance with the present invention which has the above construction. When the vehicle is running normally, the torso bag 105 and the knee bag 106 are kept in a folded-up state. If the vehicle collides with something, the pressure accumulator 141 is actuated by means of a collision sensor or the like (not shown) and the valve of the pressure accumulator 141 is opened, so that the high pressure gas flows through the manifold 143 to the gas discharging pipe 144. The high pressure gas attains a nearly uniform concentration in the gas discharging pipe 144 and is discharged from the discharge ports 144a in the gas discharging pipe 144 as a high speed jet stream as indicated by the solid arrows C in FIG. 7. At this point, the air in the passenger compartment is drawn through the air suction passages 145a by means of the high speed jet stream as indicated by the dotted arrows D. The high speed jet stream of the high pressure gas and the air drawn from the passenger compartment are mixed together, and the gas-air mixture passes through the supporting plate 146 to push the valves 147 and 148 aside as indicated by the dotted chain lines in FIG. 7. Thus, the gas-air mixture flows into the torso bag 105 and the knee bag 106 and expands these bags. At this point, the passenger 2 is in the position indicated by the dotted chain lines in FIG. 7 and is not being restrained by the bags 105 and 106. Several tens of seconds later, the passenger 2 moves forwardly and comes into contact with the bags 105 and 106 which have been expanded fully to be restrained by the bags 105 and 106. Thus, the passenger 2 is safely prevented from colliding with the dashboard or front glass of the vehicle. As the pressures in the bags increase owing to the pressures caused by the passenger restrained by the bags, the valves 147 and 148 revert to the state before the collision of the vehicle (indicated by the solid lines in FIG. 7) under their own resiliency and pressures in the bags and are closed to press the supporting plate 146.

The excesses of the gas in the bags are discharged into the passenger compartment through the discharge holes 151 in the one-way valves 147 and 148 and the supporting plate 146. The valves 147 and 148 keep the pressures in the torso bag 105 and the knee bag 106 at a predetermined value. The energy of the passenger can be absorbed in an ideal manner since the torso bag 105 and the knee bag 106 both are expanded in the way described above.

In the embodiment described above, two bags, i.e., the torso bag 105 and the knee bag 106, are used and expanded. However, even if only one bag, i.e., the torso bag 105, is used and expanded, the device in accordance with the present invention operates in the same manner as in the above embodiment. In this case also, the sectional area of the air suction passage 145a can be made large, with the result that it is possible to use a very compact pressure accumulator 141 in order to achieve an easy and advantageous installation in the vehicle of the air bag device in accordance with the present invention.

As has been described in the foregoing, the present invention enjoys a great advantage that, because the air-permeable supporting plate and the resilient valves are disposed between the gas discharging pipe and the bags in such a manner that the valves press the supporting plate, the sectional area of the air suction passage can be made large and there is attained the elimination of a decrease of the air suction efficiency due to the resistance to fluids of the supporting plate with the result that the bags can be expanded very rapidly.

The present invention also boasts an advantage that the torso bag and the knee bag, which restrain the passenger, both can be expanded simultaneously.

What is claimed is:

1. An air bag device for vehicles comprising:
 a. a gas supply source for supplying high pressure gas;
 b. a gas discharging pipe communicated with said gas supply source and adapted to discharge high pressure gas therethrough;
 c. a housing mounted to said gas discharging pipe and adapted to guide the high pressure gas discharged from said gas discharging pipe, said housing having means defining at least one large opening for introducing air from a passenger compartment in consequence of the gush of the discharged high pressure gas;
 d. at least one supporting plate fixedly mounted to one end of said housing opposite to said gas discharging pipe, said supporting plate being gas permeable;
 e. at least one valve member adapted to cover over said supporting plate, said valve member being directly opened by the gush of mixture gas constituted by mixing of high pressure gas discharged from said gas discharging pipe and air introduced from the passenger compartment so as to permit the mixture gas to pass from the inside of said housing, while blocking most counter-flow in the direction toward the inside of the housing, said valve member further having a discharge port means which allows part of the counterflow to pass therethrough; and
 f. inflatable bag means adapted to cover over said valve member, and to be inflated by the mixture gas which opens said valve member to pass through the latter;
 said valve member comprising an inner portion which is made of resilient material having discharge holes, and an outer portion of air permeable material surrounding said inner portion.

2. An air bag device for vehicles comprising:
 a. a gas supply source for supplying high pressure gas;
 b. a gas discharging pipe communicated with said gas supply source and adapted to discharge high pressure gas therethrough;
 c. a housing mounted to said gas discharging pipe and adapted to guide the high pressure gas discharged from said gas discharging pipe, said housing having means defining at least one large opening for introducing air from a passenger compartment in consequence of the gush of the discharged high pressure gas;
 d. at least one supporting plate fixedly mounted to one end of said housing opposite to said gas discharging pipe, said supporting plate being gas permeable;
 e. at least one valve member adapted to cover over said supporting plate, said valve member being directly opened by the gush of mixture gas constituted by mixing of high pressure gas discharged from said gas discharging pipe and air introduced from the passenger compartment so as to permit the mixture gas to pass from the inside of said housing, while blocking most counter-flow in the direction toward the inside of the housing, said valve member further having a discharge port means which allows part of the counter-flow to pass therethrough; and
 f. inflatable bag means adapted to cover over said valve member, and to be in inflated by the mixture gas which opens said valve member to pass through the latter;
 said valve member being made of an air permeable cloth.

3. An air bag device in accordance with claim 2, wherein said bag means comprise a torso bag; said device further comprising: an additional gas permeable supporting plate mounted to said one end of said housing; and additional valve member covering over said additional supporting plate and being directly opened by the gush of said mixture gas, while blocking most counter-flow in the direction toward the inside of the housing, said additional valve member having a discharge port means which allows part of the counter-flow to pass therethrough; and a knee bag adapted to cover over said additional valve member.

4. An air bag device for vehicles comprising:
 a. a gas supply source for supplying high pressure gas;
 b. a gas discharging pipe communicated with said gas supply source and adapted to discharge high pressure gas therethrough;
 c. a housing mounted to said gas discharging pipe and adapted to guide the high pressure gas discharged from said gas discharging pipe, said housing having means defining at least one large opening for introducing air from a passenger compartment in consequence of the gush of the discharged high pressure gas;
 d. at least one supporting plate fixedly mounted to one end of said housing opposite to said gas discharging pipe, said supporting plate being gas permeable;
 e. at least one valve member adapted to cover over said supporting plate, said valve member being directly opened by the gush of mixture gas constituted by mixing of high pressure gas discharged from said gas discharging pipe and air introduced from the passenger compartment so as to permit the mixture gas to pass from the inside of said housing, while blocking most counter-flow in the direction toward the inside of the housing, said valve member further having a discharge port means which allows part of the counterflow to pass therethrough; and
 f. inflatable bag means adapted to cover over said valve member, and to be inflated by the mixture gas which opens said valve member to pass through the latter;
 said valve member being made of an air permeable synthetic resin.

* * * * *

UNITED STATES PATENT OFFICE
CERTIFICATE OF CORRECTION

Patent No. 4,043,572　　　　　　　　Dated August 23, 1977

Inventor(s) Yoshiyuki HATTORI, Mikio SUZUKI & Masahiro TAGUCHI

It is certified that error appears in the above-identified patent and that said Letters Patent are hereby corrected as shown below:

In the heading:

Please correct the Serial Number Item [21] to read:

"595,742" as -- 596,742 --

Signed and Sealed this

First Day of November 1977

[SEAL]

Attest:

RUTH C. MASON　　　　　　　　LUTRELLE F. PARKER
Attesting Officer　　　　Acting Commissioner of Patents and Trademarks